United States Patent [19]
May et al.

[11] Patent Number: 5,495,225
[45] Date of Patent: * Feb. 27, 1996

[54] METHOD OF ALERTING A VEHICLE DRIVER TO DIFFERENT TYPES OF TRACTION LOSSES

[75] Inventors: Kenneth A. May, Churchville; Steven E. Ostertag, Rochester, both of N.Y.

[73] Assignee: Zexel Torsen Inc., Rochester, N.Y.

[ * ] Notice: The portion of the term of this patent subsequent to Jun. 15, 2010, has been disclaimed.

[21] Appl. No.: 284,571

[22] PCT Filed: Dec. 7, 1992

[86] PCT No.: PCT/US92/10513

§ 371 Date: Jul. 21, 1994

§ 102(e) Date: Jul. 21, 1994

Related U.S. Application Data

[63] Continuation of Ser. No. 824,039, Jan. 23, 1992, Pat. No. 5,220,307.

[51] Int. Cl.$^6$ ....................... B60Q 1/00
[52] U.S. Cl. ....................... 73/439; 73/453
[58] Field of Search ....................... 340/438, 439, 340/453; 364/426.02, 426.03, 426.01; 303/92

[56] References Cited

U.S. PATENT DOCUMENTS

| | | | |
|---|---|---|---|
| 2,927,302 | 3/1960 | Steigerwald | 340/453 |
| 2,930,026 | 3/1960 | Steigerwald | 340/453 |
| 3,622,977 | 11/1971 | Wakamatsu | 340/438 |
| 3,893,330 | 7/1975 | Shute et al. | 73/9 |
| 4,086,563 | 4/1978 | Bachman | 340/439 |
| 4,779,202 | 10/1988 | Leiber | 180/197 |
| 4,779,447 | 10/1988 | Rath | 364/426.01 |
| 4,854,414 | 8/1989 | Koide et al. | 180/197 |
| 4,882,693 | 11/1989 | Yopp | 73/9 |
| 4,886,322 | 12/1989 | Atkins | 303/109 |
| 5,032,821 | 7/1991 | Domanico | 340/438 |
| 5,056,354 | 10/1991 | Kuwana et al. | 73/9 |

FOREIGN PATENT DOCUMENTS

| | | |
|---|---|---|
| 0252384 | 4/1990 | European Pat. Off. . |
| 2659922 | 9/1991 | France . |
| 2624041 | 12/1977 | Germany . |
| 63-263159 | 10/1988 | Japan . |
| 1121760 | 5/1989 | Japan . |
| 223413 | 1/1991 | United Kingdom . |

*Primary Examiner*—Hezron E. Williams
*Assistant Examiner*—Christine K. Oda
*Attorney, Agent, or Firm*—Eugene Stephens & Associates

[57] ABSTRACT

A warning system alerts a driver of a motor vehicle to different types of traction losses. A first sensing circuit (10) detects a loss of wheel adhesion by monitoring a vehicle drive line for a pronounced vibration within a range of between ten and fifteen hertz. A second sensing circuit (12) monitors a brake light circuit to detect application of a vehicle brake. A logic circuit (28) combines outputs (A and B) from the first and second sensing circuits and outputs command signals (C and D) that distinguish between a loss of wheel adhesion due to wheel skidding and a loss of wheel adhesion due to wheel slipping. A warning device includes two indicators (36 and 38) that receive the respective command signals and produce sensorially distinguishable warning signals for eliciting different responses from the driver.

4 Claims, 2 Drawing Sheets

METHOD OF ALERTING A VEHICLE DRIVER TO DIFFERENT TYPES OF TRACTION LOSSES

RELATED APPLICATIONS

This is a Continuation of U.S. application Ser. No. 07/824,039, filed on Jan. 23, 1992, now U.S. Pat. No. 5,220,307, reentering the U.S. from International application No. PCT/US92/10513, filed on Dec. 7, 1992. The parent application is hereby incorporated by reference.

TECHNICAL FIELD

The invention relates to the field of vehicle traction systems and, in particular, to such systems that respond to the detection of a loss of traction with a driver warning signal.

BACKGROUND

Most traction control systems are designed to limit either wheel skidding or wheel slipping. The systems that limit wheel skidding help to decelerate vehicles by preventing wheels from rotating slower than required for maintaining adhesion with a traction surface, and the systems that limit wheel slipping help to accelerate vehicles by preventing drive wheels from rotating faster than required for maintaining the same adhesion. However, some more complicated traction systems are designed to limit both wheel skidding and wheel slipping.

Such traction control technology has been available for many years, and the advantages of this technology are widely known. Nevertheless, most automobiles are manufactured without electronic traction control systems for limiting either wheel skidding or wheel slipping, and a much smaller percentage of automobiles are manufactured to limit both. One reason for this may be the high cost of manufacturing traction control systems to operate with a degree of reliability required to supersede driver control over a vehicle. For instance, systems for limiting wheel skidding periodically take control over vehicle brakes. Systems for limiting wheel slipping periodically take control over either engine output power or its distribution to the drive wheels.

Although drivers may not be capable of responding as rapidly or effectively as advanced traction control systems to changes in vehicle operating conditions, at least some improvement to driving performance may be possible by alerting drivers to the detection of an impending loss of traction. This information about an impending loss of traction is available from traction control technology at a small fraction of the cost of a complete traction control system, because the driver retains responsibility for taking remedial action.

SUMMARY OF INVENTION

The invention involves a warning system for alerting a driver about two different types of traction losses, namely, wheel skidding and wheel slipping. Once either of the two types of traction losses are detected, a warning device emits one of two sensorially distinguishable signals for eliciting different responses from the driver to the detection of wheel skidding or wheel slipping.

The correct driver response to the detection of wheel skidding is to at least partially release the vehicle brakes, whereas the correct response to the detection of wheel slipping is to at least partially release the vehicle throttle. The two signals emitted by the warning device are made distinguishable so that the driver can learn to make correct responses within a minimum of reaction time to avoid a more serious loss of traction that could involve a loss of control over the vehicle.

Preferably, the two warning signals are distinguishable by the driver without changing the driver's line of sight away from the traction surface over which the vehicle is being driven. For example, the signals can be presented in a holographic display or the signals can be composed of sound including speech. To further help elicit the correct response from the driver, one of the sounds can be suggestive of wheel skidding such as a screeching sound, and the other sound can be suggestive of wheel slipping such as a whining sound. However, neither sound should be especially alarming to avoid eliciting an inappropriate response.

A first sensing circuit monitors the vehicle drive train for a pronounced vibration that is known to accompany a loss of adhesion by a vehicle wheel with respect to a relatively moving traction surface. The pronounced vibration, which is generally within a range of between ten and fifteen hertz, accompanies both wheel skidding and wheel slipping. A second sensing circuit preferably monitors a brake light circuit to detect application of the vehicle brakes. A logic circuit combines outputs from both sensing circuits to distinguish between a loss of adhesion due to wheel skidding and a loss of adhesion due to wheel slipping.

The logic circuit outputs a first command signal indicative of wheel skidding in response to the detection of both the loss of wheel adhesion and the application of the brakes. A second command signal indicative of wheel slipping is output from the logic circuit in response to the detection of the loss of wheel adhesion but not the application of the brakes. The two command signals control a warning device for producing the sensorially distinguishable signals that are intended to help elicit different correct responses from the driver.

DRAWINGS

DETAILED DESCRIPTION

Figure 1:
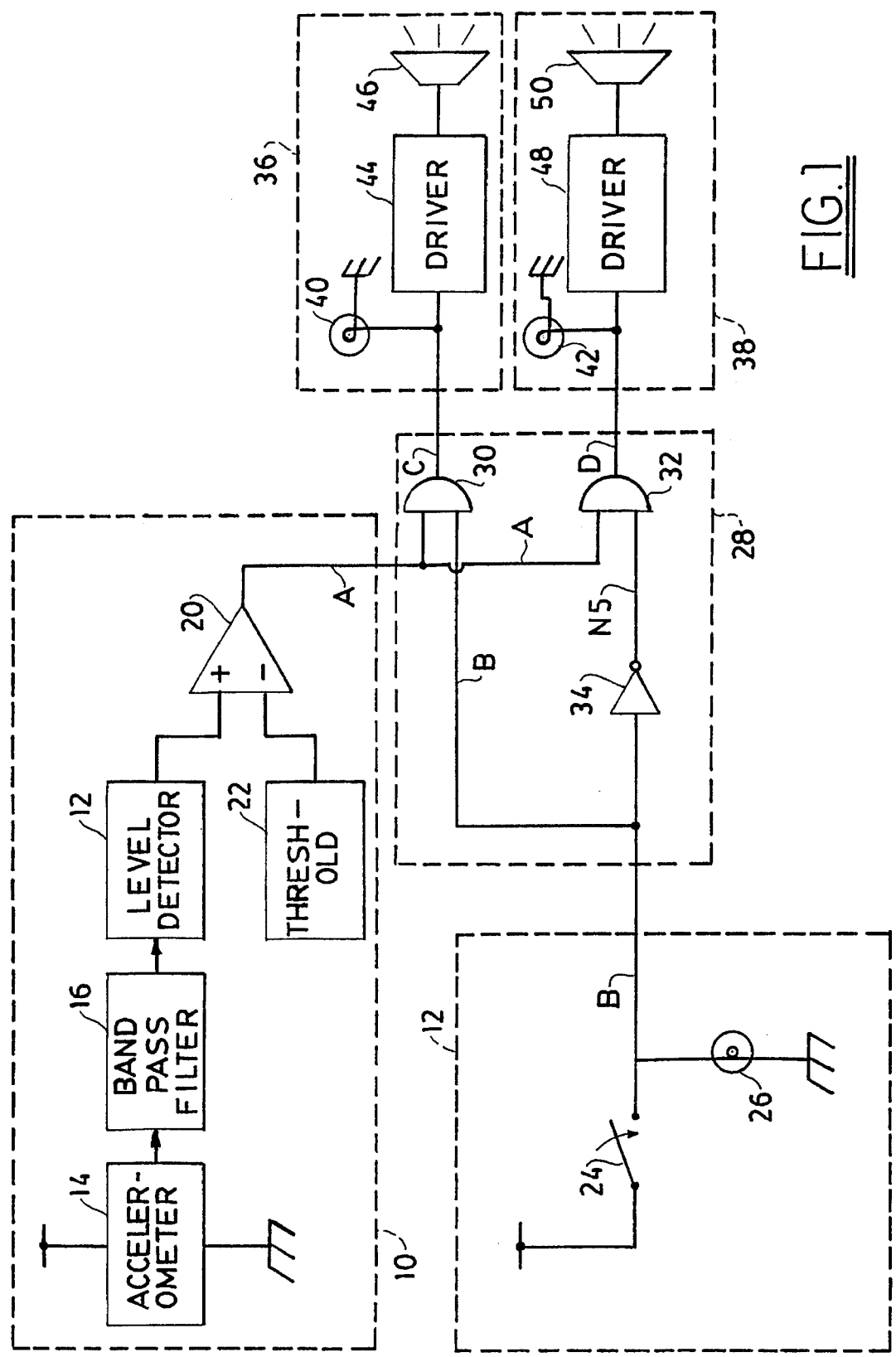
FIG. 1 is a schematic diagram of an electronic circuit proposed for a new driver warning system distinguishing wheel skidding and wheel slipping.

The new warning system has two sensing circuits 10 and 12 shown in FIG. 1. The sensing circuit 10 includes an accelerometer 14 or other known sensor (e.g. rotational speed sensor) for measuring vibration in a vehicle drive line. A band pass filter 16 receives output from the accelerometer 14 and transmits a limited band of frequencies between ten to fifteen hertz—the known frequency range of rotational speed fluctuations induced by a vehicle wheel having lost adhesion with respect to a relatively moving traction surface.

A level detector 18 monitors the amplitude of the limited band of frequencies and outputs a root-mean-square value to one input of a comparator 20. The other input of comparator 20 is supplied by a threshold setting 22, which is a minimum root-mean-square value of the frequency band characteristic of a loss of adhesion by one of the vehicle wheels. Output of the comparator 20 is a logical binary signal "A" having "high" and "low" states that respectively distinguish between root-mean-square values above and below the threshold setting.

The sensing circuit 12 is associated with a vehicle brake light circuit including a brake switch 24 that is closed in response to application of the brakes (e.g., depression of brake pedal) and a brake light 26. The closed and open positions of the brake switch 24 produce a logical binary signal "B" also having "high" and "low" states that respectively distinguish between the brakes being applied and not applied.

The two logical binary signals "A" and "B" are combined in a logic circuit 28 that includes two logical "AND" gates 30 and 32. The signal "A" provides one of the inputs to each of the "AND" gates 28 and 30. The signal "B" provides the other input to "AND" gate 30, but an inverter (or "NOT" gate) 34 inverts the signal "B" to a logical binary signal "NB", which has the logical value "NOT B" and provides the other input to "AND" gate 32. Output of the "AND" gate 30 is a logical binary signal "C" that has a "high" state only if both of the signals "A" and "B" also have high states. Similarly, "AND" gate 32 outputs a logical binary signal "D" that has a "high" state only if both signals "A" and "NB" also have "high" states.

A "high" state of signal "C" represents a situation in which both a loss of wheel adhesion has been detected and the vehicle brakes have been applied. This indicates that the loss of traction is due to wheel skidding, where at least one of the wheels is held from rotating as much as required to maintain adhesion with a relatively moving traction surface. A "high" state of signal "D" represents a situation where a loss of traction has occurred without the brakes being applied. This indicates that the loss of traction is due to wheel slipping, where at least one of the wheels is driven to rotate more than required to maintain adhesion with a relatively moving traction surface. Lateral wheel slipping in which the wheels are moved out of their plane of rotation by lateral acceleration of the vehicle over the traction surface also satisfies the conditions for a "high" state of signal "D". Nonetheless, the correct response to either form of wheel slipping is to diminish throttle and allow the slipping wheel to regain traction.

The "high" states of signals "C" and "D" exit the logic circuit 28 as system voltages capable of powering a warning device that includes both a wheel skidding indicator 36 and a wheel slipping indicator 38. Both indicators 36 and 38 include respective warning lamps 40 and 42 that are intended to illuminate separate warning messages on a driver display panel. The indicator 36 also includes a driver 44 and a speaker 46 for emitting a sound suggestive of wheel skidding, such as a screeching sound. Similarly, a driver 48 and a speaker 50 of the indicator 38 produce a sound suggestive of wheel slipping, such as a whining sound. Of course, a single speaker or piezo transducer could be driven to emit the different sounds.

Although the respective warning sounds are intended to be suggestive of wheel skidding and wheel slipping, neither sound is intended to be overly alarming; and both sounds are intended to be easily distinguishable from the actual sounds of wheel skidding and wheel slipping. For example, the screeching sound is preferably softened to dampen any shrill tones that could induce excessive alarm in the driver. The warning sounds are made distinguishable from the actual sounds they suggest so that information about vehicle performance from the actual sounds can also be discerned by the driver.

Figure 2:
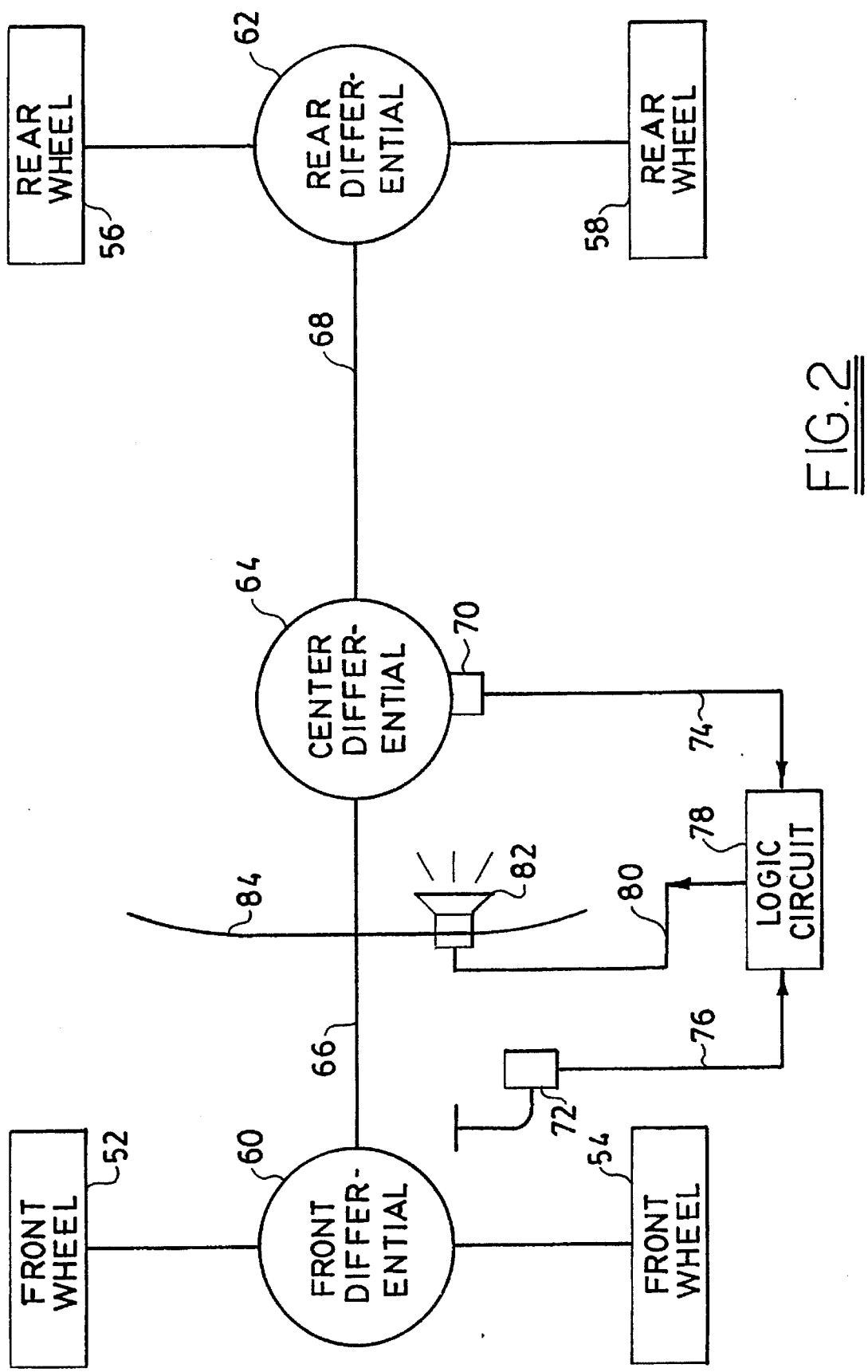
FIG. 2 is a schematic diagram of an all wheel drive vehicle incorporating the new warning system.

A preferred installation of the warning system in an all wheel drive vehicle is shown in FIG. 2. The vehicle has two front wheels 52 and 54 and two rear wheels 56 and 58, all of which are driven by a vehicle drive train that includes three differentials 60, 62, and 64. The front differential 60 interconnects axle halves of the two front wheels 52 and 54 with a front drive shaft 66. The rear differential 62 similarly interconnects axle halves of the two rear wheels 56 and 58 to a rear drive shaft 68. The two drive shafts 66 and 68 are interconnected with each other and with a source of motive power (not shown) by center differential 64.

An accelerometer 70, incorporated as a part of a vibration sensing circuit, is attached to the center differential 64 to detect mechanical vibrations within a frequency band between ten and fifteen hertz in the drive line to all four wheels. A brake light switch 72 is similarly incorporated into a brake application sensing circuit. Respective sensor signals 74 and 76 originating from the accelerometer 70 and brake light switch 72 are input to a logic circuit 78 that distinguishes wheel skidding and wheel slipping. A command signal 80 is conveyed from the logic circuit 78 to a warning device 82 that is mounted in a vehicle dash board 84. The warning device 82 emits two sensorially distinguishable signals in response to the command signal 80 for separately alerting a driver to the detection of wheel skidding and wheel slipping.

The warning system is preferably made as simple and as inexpensive as possible to provide a low cost alternative to more expensive traction control systems. However, more than one sensor may be needed to detect a loss of adhesion by wheels that are not connected to a common drive line. Additional sensors can also be used to provide information to the driver about which wheel has experienced a loss of adhesion.

The sensor, logic, and warning device circuits can be constructed from discrete components or can be incorporated into a microprocessor system. Sensing or processing capabilities already available in vehicles can also be used in place of one or more components of the warning system.

We claim:

1. A method of alerting a vehicle driver to different vehicle operating conditions comprising the steps of:

sensing the vehicle operating conditions including rotation of a drive wheel with respect to the drive wheel's traction surface;

distinguishing the operating conditions between:
  (a) wheel skidding in which the drive wheel rotates slower than required for maintaining adhesion with the traction surface; and
  (b) wheel slipping in which the drive wheel rotates faster than required for maintaining adhesion with the traction surface; and producing sensorially distinguishable warning signals for eliciting different responses from the vehicle driver in response to the conditions of wheel slipping and wheel skidding.

2. The method of claim 1 in which said step of producing warning signals includes producing warning signals that are sensorially distinguishable by the driver without changing a driver's line of sight away from the traction surface.

3. The method of claim 1 in which said step of producing warning signals includes producing respective warning signals that are suggestive of wheel skidding and wheel slipping.

4. The method of claim 2 in which said warning signals are audible.

* * * * *